United States Patent
Khan (12)

(10) Patent No.: US 6,562,388 B2
(45) Date of Patent: May 13, 2003

(54) METHOD OF MAKING FAST COOKING FLOUR

(76) Inventor: Sajid Ali Mirza Khan, 2 Union Pl., Ridgefield Park, NJ (US) 07660

( * ) Notice: Subject to any disclaimer, the term of this patent is extended or adjusted under 35 U.S.C. 154(b) by 0 days.

(21) Appl. No.: 10/096,146

(22) Filed: Feb. 27, 2002

(65) Prior Publication Data

US 2002/0110630 A1 Aug. 15, 2002

Related U.S. Application Data

(63) Continuation-in-part of application No. 09/781,514, filed on Feb. 12, 2001, now abandoned.

(51) Int. Cl.[7] .............................. A23B 4/03; A21D 10/00

(52) U.S. Cl. ....................................... 426/465; 426/549

(58) Field of Search .................................. 426/549, 443, 426/465

(56) References Cited

U.S. PATENT DOCUMENTS

| 5,194,276 A | * | 3/1993 | Hoseney et al. | 426/242 |
| 5,362,329 A | * | 11/1994 | Yoshino et al. | 127/65 |
| 5,786,018 A | * | 7/1998 | Toh | 426/557 |
| 5,846,591 A | * | 12/1998 | Satake et al. | 426/483 |
| 5,902,629 A | * | 5/1999 | Baker et al. | 426/634 |

FOREIGN PATENT DOCUMENTS

| GB | 228829 | * | 12/1924 |
| GB | 263897 | * | 12/1926 |
| JP | 410042778 | * | 2/1998 |

* cited by examiner

Primary Examiner—Nina Bhat

(57) ABSTRACT

Half-baked flours for making breads, cakes, pancakes, biscuits, tortillas, muffins, cookies, patties, pizzas, nans, brioches, chapaties, nachos, bagels, rolls etc. by heat treating the grain which is dry heated for a time and duration which is then ground into flour, which can be used in flour containing products which provide a faster cooking product than using conventional flour.

2 Claims, No Drawings

METHOD OF MAKING FAST COOKING FLOUR

This application is a continuation-in-part of 09/781,514, filed Feb. 12, 2001, now abandoned.

BACKGROUND OF THE INVENTION

A Prior Art exists in relation to this invention. JP41042778, Rodriguez ES2017138, Ab263897 and GB228829 all teach a mixture of cooked and uncooked flour to enhance the flavor of the flour. However, the problem with these resultant flours is that the precooked part tends to overcook and the raw part stills needs 100% time to cook fully. While my Half-baked flour is 100% partly cooked. Thus it requires less time to make the end product from my Half-baked flour.

BRIEF SUMMARY OF INVENTION

The present invention relates to making available to the consumer Half-baked flours. I have discovered that any and all kinds of flours in the market can be partly precooked and made available to the consumer. Partly cooked flours have several advantages over what is available in the market today. Partly cooked flours save time, labor, fuel, money, materially enhance the quality of the environment, and enhance the flavor as well as prolong the life of the flour.
a) The grain for making the flour will be half-baked in large commercial facilities; thus the damage to the environment will be minimum, as the pollution will be controlled through efficient filters.
b) As the flour will already be half-cooked people will spend less time making bread and will have more time for their families.
c) Less work will mean less tiredness and more time for rest etc.
d) As bread tends to overcook on the outside and usually remains undercooked on the inside it will now be possible to cook the bread more evenly, enhancing the flavor of the bread. The same will happen with all other flour products.
e) As the half-cooked flour will contain less moisture, it will be more seasoned then the raw flour and will last longer.
f) Commercial quantities of half-baked flour can be made where fuel is cheap and available in large quantities.
g) People will use less fuel to cook with half-baked flour thus saving money as fuel. It will also result in savings of wood, coal and gas etc.
h) Not just bread but also everything and anything that is made with flour can be made with Half-baked flour and will have the same above advantages.

DETAILED DESCRIPTION OF THE INVENTION

The present invention relates to making available to the consumer Half-baked flour. The method of Half-baking flour is to take the wheat grain or any other grain of which the flour is to be made and subject it to dry heat of 200 degrees F. for four hours in a closed vessel, the wheat grain is then ground and the Half-baked flour is obtained. When the grain is subjected to a higher temperature, say, 300 degrees F., the resultant grain when ground into flour is not of the same quality in flavor. However the other benefits remain the same.

Each and every flour that is available in the market today can be Half-baked before marketing. From single grain to multi-grain, from the finely ground to the course ground, nothing changes except that it is Half-baked. Pastry flour, all purpose flour, high gluten flour, whole wheat, bread flour, pancake flour, cassava flour, buckwheat flour, bran flour, soybean flour, barley flour, corn flour, oat flour, rye flour, rice flour, millet flour, etc. Each and every kind of end product such as cakes, pancakes, breads, tortillas, chapaties, pizzas, nachos, nans, brioches, muffins, cookies, bagels, biscuits, rolls etc., can all be made with half-baked flours.

French brioche was made with half-baked flour. At a temperature of 370 degrees F. it took 17 minutes to bake. The same made regular flour at the same temperature took 37 minutes to bake. Again corn biscuits were made with half-baked corn flour. At a temperature of 375 degrees F. it took 12 minutes to bake. Corn biscuits made with conventional corn flour at the same temperature took 22 minutes to bake. Wheaten bread was made with half-baked flour. At a temperature of 425 degrees F. it took 18 minutes to bake. With regular bread flour at the same temperature it took 35 minutes. In all three cases the flavor was much better.

What is claimed is:
1. A process of preparing a fast cooking flour from wheat grain wherein said wheat grain is heated to a temperature of at least 200 degrees F. for about 4 hours, grinding said wheat grain into flour.
2. A process of using the fast cooking flour of claim 1, in flour containing food products selected from the group consisting of breads, muffins, cakes, pizza, cookies, biscuits, brioches, tortillas, nans, and pancakes, wherein the flour containing food products cook in less time than food products made from conventional flours.

\* \* \* \* \*